June 2, 1964  C. S. REED  3,134,989
COMPOSITE PAD-TYPE INSULATOR
Filed Jan. 29, 1962  2 Sheets-Sheet 1
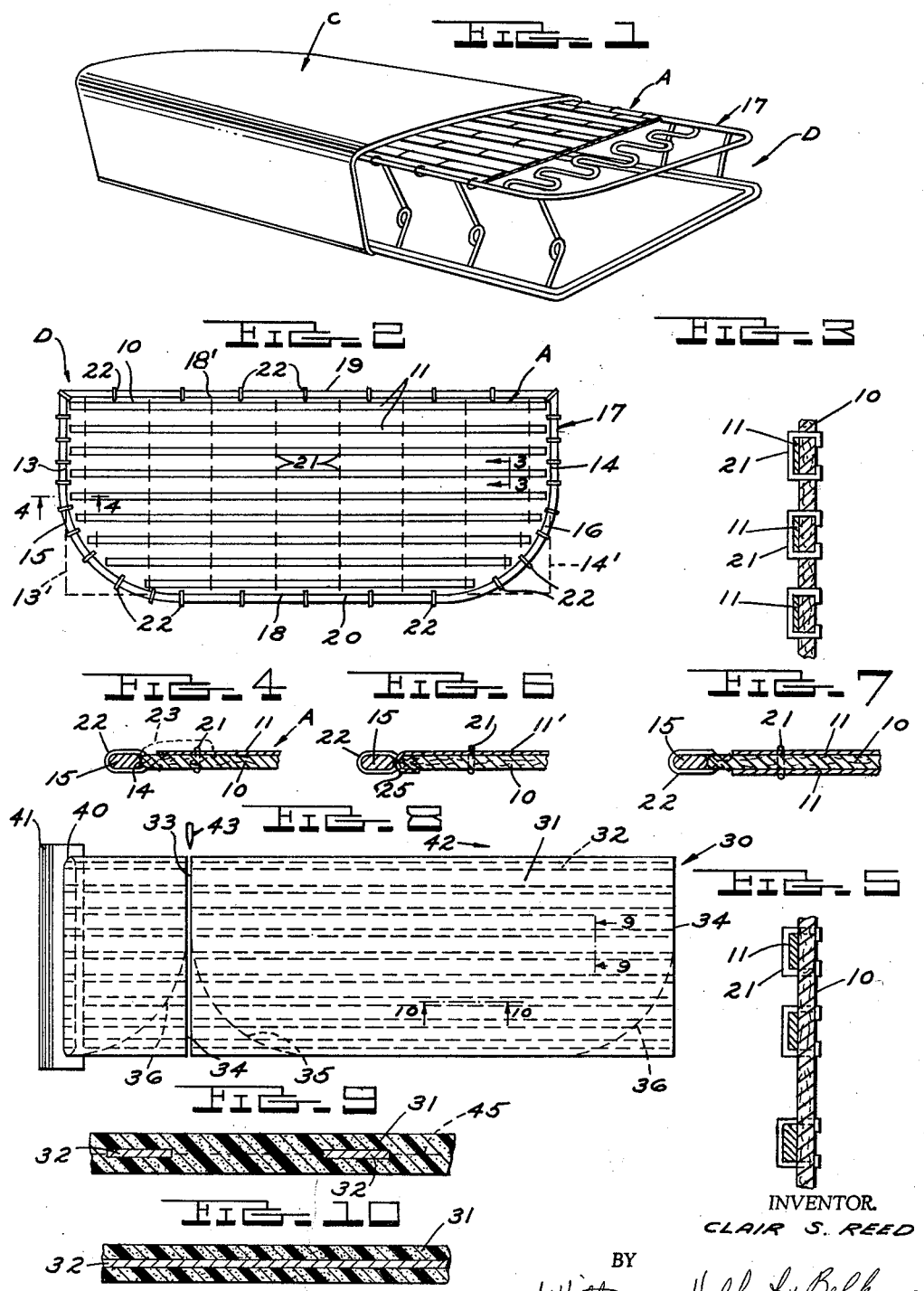
INVENTOR.
CLAIR S. REED
BY
Whittemore, Hulbert & Belknap
ATTORNEYS June 2, 1964  C. S. REED  3,134,989
COMPOSITE PAD-TYPE INSULATOR
Filed Jan. 29, 1962  2 Sheets-Sheet 2
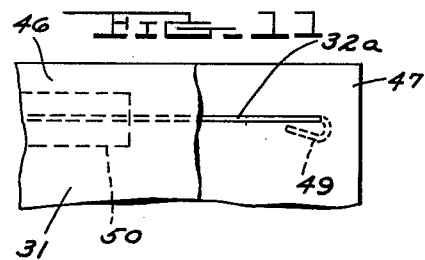
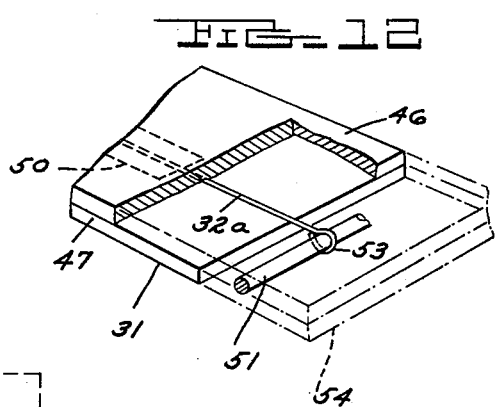
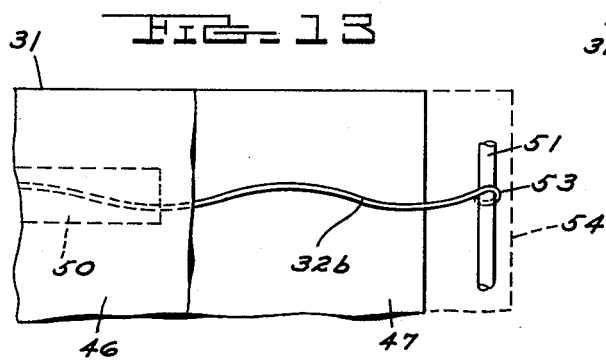
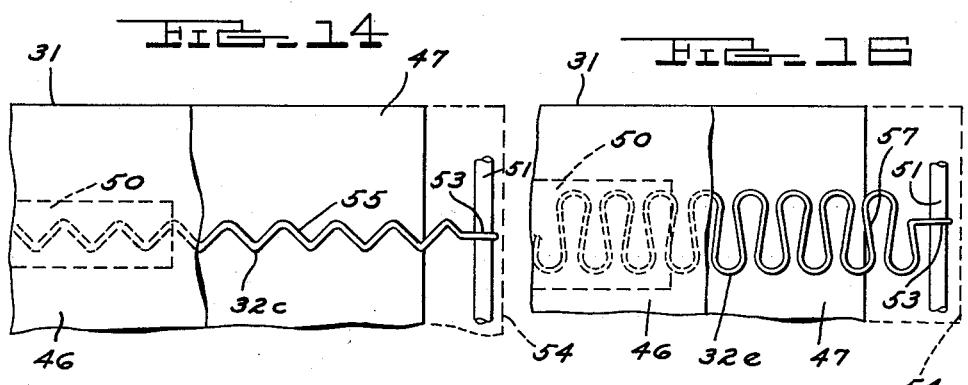
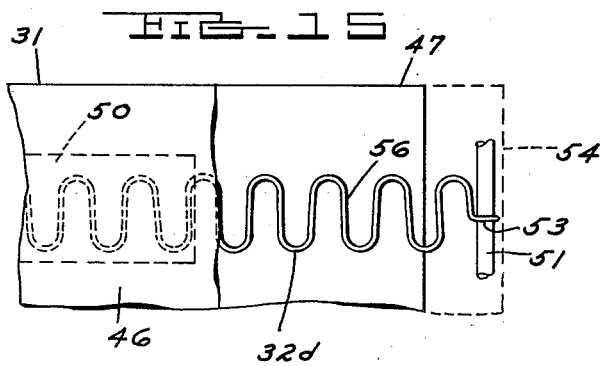
INVENTOR.
CLAIR S. REED
BY
Whittemore, Hulbert & Belknap
ATTORNEYS

United States Patent Office 3,134,989
Patented June 2, 1964

3,134,989
COMPOSITE PAD-TYPE INSULATOR
Clair S. Reed, Wayne, Mich., assignor to Van Dresser Specialty Corporation, Warren, Mich., a corporation of Michigan
Filed Jan. 29, 1962, Ser. No. 169,470
5 Claims. (Cl. 5—354)

This invention relates generally to insulators for use between the exterior trim material and supporting spring structure of an upholstered assembly, and to a method of making the same.

One of the essential objects of the invention is to provide a composite pad type insulator comprising a substantially horizontally extending, relatively thick, flexible, compressible layer of material, and a plurality of laterally spaced reinforcing strands for said layer extending generally parallel to the horizontal plane thereof.

Another object is to provide a composite pad type insulator wherein the reinforcing strands are secured to one surface of the layer of material.

Another object is to provide a composite pad type insulator wherein the ends of the layer of material are folded over the ends of the strands.

Another object is to provide a composite pad type insulator wherein the ends of the strands are return bent and folded over the opposite edges of the layer of material, terminating upon the opposite surface thereof.

Another object is to provide a composite pad type insulator wherein the reinforcing strands are secured to opposite surfaces of the layer of material.

Another object is to provide a composite pad type insulator wherein the strands are embedded in the layer of material between the opposite surfaces thereof.

Another object is to provide an insulator wherein the layer of material is composed of two laminae, and the strands are disposed therebetween.

Another object is to provide a composite pad type insulator wherein the strands are transversely flat bars.

Another object is to provide a composite pad type insulator wherein the strands are wires of straight or other configuration.

Another object is to provide a composite pad type insulator which can be readily manufactured by molding or extrusion.

Another object is to provide a method of making a composite pad type insulator comprising extruding the material from which the layer is to be formed, arranging the reinforcing strands in laterally spaced relation in alignment with the extruded material, feeding the strands into the material in the direction of and at the same speed as the material is extruded to embed the strands in the material, and severing the material and embedded strands at longitudinally spaced points corresponding to the length of the insulator.

Other objects and features of the invention will become apparent as the description proceeds, especially when taken in conjunction with the accompanying drawings, wherein:

FIGURE 1 is a perspective view of an upholstered assembly provided with a composite insulator embodying the invention, and showing parts broken away and in section.

FIGURE 2 is a top plan piew of the insulator, shown attached to the border wire of the supporting spring structure.

FIGURE 3 is a sectional view taken on the line 3—3 of FIGURE 2.

FIGURE 4 is a fragmentary sectional view taken on the line 4—4 of FIGURE 2.

FIGURE 5 is a view like FIGURE 3 but shows a modification.

FIGURE 6 is similar to FIGURE 4 but shows another modification.

FIGURE 7 is similar to FIGURE 4 but shows a further modification.

FIGURE 8 shows a modification of the insulator and also illustrates a method involved in the manufacture thereof.

FIGURE 9 is a fragmentary sectional view taken on the line 9—9 of FIGURE 8.

FIGURE 10 is a fragmentary sectional view taken on the line 10—10 of FIGURE 8.

FIGURE 11 is a fragmentary plan view of an insulator having a modified construction, with parts broken away.

FIGURE 12 is a fragmentary perspective view with parts broken away and in section, showing a further modification.

FIGURES 13, 14, 15 and 16 are fragmentary plan views, with parts broken away, showing further modifications of the invention.

In the drawings, A is an elongated, substantially horizontally extending insulator embodying my invention disposed between an overlying exterior trim material C and an underlying supporting spring structure D of an upholstered assembly.

As shown, the insulator A includes an elongated, relatively thick, flexible, compressible layer 10 of material, and a plurality of uniformly spaced, parallel, flexible, resilient, transversely flat, straight reinforcing strands or bars 11 preferably extending lengthwise of the layer 10, and secured to one surface thereof. If desired, the reinforcing strands or bars 11 may extend transversely rather than lengthwise of the layer 10. The bars may be of the same gauge as shown in FIGURE 3. They may be of different gauge and/or spacing, as explained hereinafter.

As shown, the strands or bars 11 are straight and lie in substantially surface-to-surface engagement with the layer 10. The ends of the layer 10, designated 13 and 14, are contoured to conform with the configuration of the corresponding ends 15 and 16 of the border frame 17 of the supporting spring structure D. The longitudinal sides 18 and 18' of the insulator are parallel and extend along and conform to the longitudinal sides 19 and 20 of the border frame.

The reinforcing strands or bars 11 are of lengths corresponding generally to the contour of the layer 10. Actually the opposite ends of the strands or bars terminate short of the opposite contoured ends 13 and 14 of the layer of material 10, as seen in FIGURES 2 and 4, although, if desired, the ends of the strands or bars may extend flush with the ends of the layer of material.

Securing means, preferably in the form of generally C-shaped staples 21, are provided to secure the strands or bars to one surface of the sheet at laterally spaced points thereof. Instead of staples, stitching or any other suitable securing means may be employed.

The insulator A is marginally secured to the sides and ends of the border frame, as shown in FIGURES 2 and 4. For this purpose, fasteners preferably in the form of hog rings 22 are provided which pierce the material of the layer 10 and encircle the sides and ends of the border frame.

The contoured ends of the layer 10 of insulator A may be extended and folded over the ends of the reinforcing strands or bars 11. This is shown dotted at 23 in FIGURE 4, and it will be understood that the other end of the insulator will be the same. The folded portions 23 will be secured in place by the fasteners 21.

The ends of the layer 10 of the insulator may be straight, as indicated in dotted lines in FIGURE 2 at 13' and 14', in which case the overall shape of the insulator would be rectangular. The reinforcing strands or bars, of a rectangular insulator would be of uniform length corresponding in length to the strands in the upper portion of FIGURE 2. The corners of the rectangular insulator would be folded over the rounded portions of the ends 15 and 16 of the border frame. The strands or bars as well as the layer 10 would be thus folded over the rounded portions of the ends of the border frame. The hog rings along the rounded corners of the border frame would pierce not only the material of the insulator proper, but also the material of the folded portions thereof.

Although the various elements of the insulator may be formed of any suitable material for the purposes set forth, the layer 10 is preferably formed of resinated cotton, foam rubber, polyurethane, or any other suitable material which is soft and compressible to provide a flexible padded layer. The reinforcing strands 11 are formed preferably of flat metal stock.

FIGURE 5 is like FIGURE 3 but shows a modification wherein the strands or bars 11 are of different gauge and spacing. It will be understood that the insulator may have strands or bars of the same gauge and different spacing, or different gauge and the same spacing.

FIGURE 6 shows a modification of the insulator A wherein the strands or bars 11' are actually longer than the layer 10 and the extended ends are folded or return bent, as indicated at 25, to extend over the ends of the insulator layer 10 and along the underside thereof. Otherwise the strands or bars 11' are like strands or bars 11. It will be understood that the arrangement shown in FIGURE 6 applies to both edges of the insulator.

The insulators of FIGURES 2–6 can be installed in an upholstered assembly in the manner shown in FIGURE 1, that is with the strands or bars 11 on the top, or the insulators can be inverted and installed with the strands on the bottom.

FIGURE 7 shows a further modification of the insulator in which reinforcing strands or bars 11 are on both sides of layer 10. The reinforcing strands or bars 11 on one side of layer 10 will lie directly underneath and be vertically opposed to those on the other side. Accordingly, the arrangement of insulator strands or bars on the opposite sides will be exactly the same and the appearance of the insulator on either side will be the same. Both sides of the insulator will appear as in FIGURE 2. Hence, the same staples 21 for securing the strands or bars on one side of the layer 10 also secure the vertically opposed strands or bars on the opposite side. It will be noted that the insulator bars terminate short of the opposite edges of the layer 10.

The modifications shown in FIGURES 4–7 may be considered as modifications of the contoured insulator of FIGURE 2 and also the rectangular insulator shown in dotted lines therein.

FIGURES 8–10 illustrate an insulator 30 having still a different construction. Insulator 30 has an elongated layer 31 which may be of the same material as the layer 10 previously described, and a plurality of laterally spaced, parallel, reinforcing strands or bars 32 preferably extending lengthwise of layer 31 and embedded therein between its opposite surfaces. The strands or bars 32 are like the strands or bars 11 previously described. However, the ends of the strands or bars extend flush with the opposite edges 33 and 34 of the layer 31. The strands or bars could, if desired, terminate short of the opposite edges 33 and 34 of the layer.

As shown by dotted lines 35 and 36, the ends of the layer 31 may be contoured to conform to the configuration of the border frame of the supporting spring structure, in which event the ends of the strands or bars would be of varying length, terminating either flush with or somewhat short of the ends 35 and 36 of layer 31.

The insulator 30 may be formed by molding or extrusion. Referring to FIGURE 8, the material of which the layer 31 is formed, for example foam rubber of polyurethane, is shown being extruded from the elongated opening 40 of an extruder 41 in the direction of the arrow 42. The opening has a configuration equal to the desired cross-section of the layer 31, that is, the length and width of the opening are respectively equal to the width and thickness of layer 31. Strands or bars 32 having the cross-section shown in FIGURE 9 are fed continuously through the opening in the direction the layer is extruded. The material is extruded continuously in a width and thickness corresponding to that of the layer 31, and the strands or bars will be fed along with the extruded material from continuous lengths of stock and at the same rate of speed as the layer so as to be embedded in the layer between opposite surfaces thereof.

The insulators may be severed from the leading end of the extruded material which leaves the opening 40 in a continuous length, by an intermittently operated cutter 43. The cutter may be operated at timed intervals depending on the length of insulator desired during the continuous uninterrupted movement of the extruded material and embedded strands or bars. The cutter 43 may cut straight across to provide rectangular insulators as shown, or the cutter may be contoured to cut along the dotted lines 35 and 36 and form ends contoured to match the ends of the border frame.

If desired, the foam rubber or polyurethane can be extruded from a larger opening, i.e., an opening having greater depth than the opening 40, and the strands may be fed in vertically spaced horizontal planes through the thicker layer of extruded material, in which event the layer could be sliced by suitable means, not shown, at the desired elevations of the layer to provide a number of pads wherein each would be provided in the body thereof with the reinforcing strands.

The insulator 30 may also be formed by molding, that is by placing the strands or bars in a mold preferably having the marginal outline of the insulator and filling the mold with the material of which the layer 31 is formed to embed the strands or bars therein. The strands or bars could extend either lengthwise of the molded pad as shown, or transversely thereof, that is at right angles or some other angle to the length of the pad.

Instead of a single lamination, the layer 31 of the insulator of FIGURES 8–10 may be formed of two laminae, as indicated by the dotted line 45 in FIGURE 9. The laminae may be of any suitable material, such, for example, as those mentioned for layer 10. The two laminae may be secured together in surface-to-surface relation by any suitable means such as by an adhesive. The reinforcing strands or bars may be secured to the laminae by the adhesive securing the laminae together, or they may be secured to one of the laminae by separate adhesive strips, such as the strips 50 in FIGURES 11–16.

It will be understood that the insulator 30 in FIGURES 8–10, whether extruded or molded, or of one lamination or two, may be provided with strands of the configuration shown in FIGURES 11–16, if desired, instead of the strands or bars 32.

FIGURE 11 shows a modification of the laminated insulator of FIGURES 8–10, the laminae here designated 46 and 47. The laminated insulator in FIGURE 11 is like the laminated insulator of FIGURES 8–10 insofar as the laminae of the layer 31 are concerned. However, the reinforcing strands 32a are elongated, straight, flexible, resilient, small diameter wires. The wires 32a are arranged as the flat strands or bars 32 in FIGURES 8–10 are arranged; that is, they extend parallel to one another in laterally spaced relation and lengthwise of the layer 31. The ends of the wires terminate short of the ends of the layer 31, and may or may not be formed with loops 49, shown in dotted lines, to prevent needling. The wire strands may, if desired, be secured to one of the laminae 47 by strips of adhesive tape 50.

FIGURE 12 differs from FIGURE 11 in that cords 51 extend along both ends of layer 31. The wire strands 32a are provided at both ends with loops 53 which encircle and grip the cords. The cords may be disposed beyond the ends of the layer 31 of the insulator, as shown in solid lines, or the ends of the insulator may extend beyond the cord, as shown by the dotted lines 54.

FIGURE 13 differs from FIGURE 12 in that the wire strands 32b are helical from one end to the other.

FIGURE 14 differs from FIGURE 12 in that the wire strands 32c are formed with V-shaped undulations from end to end. The undulations 55 all lie in a single plane parallel to those of the laminae 46 and 47.

FIGURE 15 differs from FIGURE 14 in that the wire strands 32d are formed with U-shaped undulations 56 from end to end, all of which lie in a single plane parallel to those of the laminae 46 and 47.

FIGURE 16 differs from FIGURE 15 in that the wire strands 32e are formed with undulations 57 of cloverleaf shape from end to end, all of which lie in a single plane parallel to those of the laminae 46 and 47.

It will be understood that in each of FIGURES 11–16 the upper right hand corner of a laminated insulator, such as shown in FIGURES 8–10, is illustrated, differing from FIGURES 8–10 in the cross-section and configuration of the reinforcing strands. While only one strand is shown in each of FIGURES 11–16, it will also be understood that the other strands will be of the same cross-section and configuration, and arranged in laterally spaced parallel relation preferably lengthwise of the insulator, as in FIGURES 8–10.

It will be understood in connection with FIGURES 13–16, that the special wire form may be continuous from end to end or it may be interrupted by straight sections of wire.

It will also be understood that when any of the insulators described is installed in an upholstered assembly, an additional layer of padding may be placed between the insulator and the exterior trim material C, if desired.

In each of the modifications shown, the strands or bars may be of the same or different gauge, and of the same or different spacing.

What I claim as my invention is:

1. A composite pad-type insulator for use between an overlying exterior trim and an underlying supporting spring structure; comprising a substantially horizontally extending elongated flexible relatively thick layer of compressible material, a plurality of individual transversely spaced substantially parallel flexible metal reinforcing strands disposed upon and in surface-to-surface relation with one surface of said layer, said individual strands extending lengthwise of said layer, and individual fastening means securing the individual strands to said layer, including separate elements respectively having portions extending over the individual strands and having portions rigidly secured to said layer.

2. The composite pad-type insulator defined in claim 1, wherein the strands are in the form of individual flat metal bars, and the individual fastening means secure said individual flat metal bars to said layer and are separate metal elements respectively having portions extending transversely over said flat bars at longitudinally spaced points thereof and having portions extending through and terminally secured to said layer.

3. The composite pad-type insulator defined in claim 1, wherein the individual fastening means securing said individual strands to said layer are separate strips of adhesive tape respectively having portions extending lengthwise over said strands and having portions adhered to said layer.

4. A composite pad-type insulator for use between an overlying exterior trim and an underlying supporting spring structure; comprising a substantially horizontally extending elongated flexible relatively thick layer of compressible material, a plurality of individual transversely spaced substantially parallel flexible metal reinforcing strands disposed upon and in surface-to-surface relation with one surface of said layer, a plurality of individual transversely spaced substantially parallel flexible metal reinforcing strands disposed upon and in surface-to-surface relation with the opposite surface of said layer in substantially vertically aligned relation with the strands upon said one surface whereby the respective strands on opposite surfaces of said layer comprise pairs of substantially vertically aligned strands, and common securing means for each pair of substantially vertically aligned strands, including separate metal elements respectively having portions extending transversely over each pair of said substantially vertically aligned strands and having portions extending through said layer.

5. The composite pad-type insulator defined in claim 4, wherein the strands are in the form of flat metal bars.

References Cited in the file of this patent

UNITED STATES PATENTS

| | | |
|---|---|---|
| 2,221,507 | Clark | Nov. 12, 1940 |
| 2,283,116 | Young | May 12, 1942 |
| 2,582,479 | Clark | Jan. 15, 1952 |
| 2,714,571 | Irion et al. | Aug. 2, 1955 |
| 2,906,320 | Reed | Sept. 29, 1959 |
| 2,940,512 | Reed | June 14, 1960 |
| 2,979,431 | Perrault | Apr. 11, 1961 |
| 3,024,477 | Reed | Mar. 13, 1962 |